(12) United States Patent
Chan et al.

(10) Patent No.: US 12,585,356 B2
(45) Date of Patent: Mar. 24, 2026

(54) STYLUS SENSING CIRCUIT AND STYLUS

(71) Applicant: NOVATEK Microelectronics Corp.,
Hsin-Chu (TW)

(72) Inventors: Ting-Yu Chan, Hsinchu (TW);
Yun-Hsiang Yeh, Hsinchu (TW);
Chi-Te Lin, Hsinchu County (TW)

(73) Assignee: NOVATEK Microelectronics Corp.,
Hsin-Chu (TW)

( * ) Notice: Subject to any disclaimer, the term of this
patent is extended or adjusted under 35
U.S.C. 154(b) by 0 days.

(21) Appl. No.: 18/586,529

(22) Filed: Feb. 25, 2024

(65) Prior Publication Data

US 2025/0271965 A1      Aug. 28, 2025

(51) Int. Cl.
G06F 3/041 (2006.01)
G06F 3/0354 (2013.01)
G06F 3/038 (2013.01)

(52) U.S. Cl.
CPC ........ G06F 3/0418 (2013.01); G06F 3/03545
(2013.01); G06F 3/0383 (2013.01); *G06F*
*2203/04106* (2013.01)

(58) Field of Classification Search
CPC ......... G06F 2203/04106; G06F 3/0383; G06F
3/0418; G06F 3/03545
See application file for complete search history.

(56) References Cited

U.S. PATENT DOCUMENTS

| | | | | |
|---|---|---|---|---|
| 7,995,036 | B2 * | 8/2011 | Perski ................... | G06F 3/0441 |
| | | | | 345/173 |
| 11,467,690 | B1 * | 10/2022 | Chang ................... | G06F 3/0442 |
| 11,500,481 | B1 * | 11/2022 | Hung ..................... | G06F 3/0383 |
| 2009/0244014 | A1 * | 10/2009 | Hotelling .................. | G06F 3/05 |
| | | | | 345/173 |
| 2011/0155479 | A1 * | 6/2011 | Oda ......................... | G06F 3/044 |
| | | | | 178/19.04 |
| 2016/0195943 | A1 * | 7/2016 | Gur ........................ | G06F 3/0441 |
| | | | | 345/179 |
| 2016/0209944 | A1 * | 7/2016 | Shim .................... | G06F 3/04166 |
| 2017/0285773 | A1 * | 10/2017 | Ayzenberg .......... | G06F 3/04162 |
| 2019/0163320 | A1 * | 5/2019 | Park ................... | G06F 3/03545 |
| 2020/0133457 | A1 * | 4/2020 | Chen ................... | G06F 3/04164 |
| 2020/0225772 | A1 * | 7/2020 | Koike ................. | G06F 3/03545 |
| 2021/0055829 | A1 * | 2/2021 | Miyamoto ........ | H04W 72/0446 |
| 2022/0057870 | A1 * | 2/2022 | Miyamoto ............ | G06F 3/0383 |
| 2022/0317788 | A1 * | 10/2022 | Fleck .................... | G06F 3/0383 |

FOREIGN PATENT DOCUMENTS

| | | |
|---|---|---|
| TW | 201519017 A | 5/2015 |
| TW | 202331476 A | 8/2023 |
| WO | 2023/198051 A1 | 10/2023 |

* cited by examiner

*Primary Examiner* — Bipin Gyawali
(74) *Attorney, Agent, or Firm* — Winston Hsu

(57) ABSTRACT

A stylus sensing circuit includes a receiving circuit, a
demodulation circuit and a detection circuit. The receiving
circuit receives a downlink signal from a stylus, wherein the
downlink signal includes a plurality of frequency signals.
The demodulation circuit, coupled to the receiving circuit,
demodulates the downlink signal to extract each of the
plurality of frequency signals. The detection circuit, coupled
to the demodulation circuit, chooses one of the plurality of
frequency signals to perform a signal processing.

24 Claims, 8 Drawing Sheets

Noise(F1)

Finger/Hand   Finger/Hand   Finger/Hand   ...

Stylus        Stylus        Stylus
(F1、F2...)   (F1、F2...)   (F1、F2...)

t

TH   Noise

F1   F2 f

F1>TH
F2<TH
F1 has noise
F2 is clean

|    | FP1  | FP2  | FP3  | FP4  | FP5  | FP6  |    | VAR |
|----|------|------|------|------|------|------|----|-----|
| F1 | 2000 | 1900 | 1950 | 2000 | 1900 | 1950 |    | 100 |
| F2 | 1950 | 1900 | 1900 | 1950 | 1900 | 1900 |    | 50  |
| F3 | 2020 | 1900 | 2000 | 2020 | 1700 | 2100 |    | 400 |

Include noise interference greater than threshold

STYLUS SENSING CIRCUIT AND STYLUS

BACKGROUND OF THE INVENTION

1. Field of the Invention

The present invention relates to a stylus sensing circuit and a stylus, and more particularly, to a stylus sensing circuit and a stylus with multi-frequency transmissions.

2. Description of the Prior Art

An active stylus is a common peripheral device used for an electronic device having a touch panel, such as a mobile phone or laptop. Most currently available active styluses in the market are bidirectional styluses, which may receive uplink signals from a touch panel and also send downlink signals to the touch panel to perform stylus control. In order to save the costs of the stylus, a low-cost easy pen is developed. The easy pen can only perform unidirectional transmission with the touch panel; that is, the easy pen is allowed to continuously send downlink signals to the touch panel without synchronization with any uplink signals. As for the bidirectional stylus, if the touch panel determines that a noise might interfere with a specific frequency on which the downlink signal output by the stylus is located, it may notify the stylus through the uplink signals, to instruct the stylus to change its output frequency. However, the easy pen is not allowed to receive the uplink signals, and thus cannot change its output frequency under noise interferences, resulting in a worse anti-noise capability.

SUMMARY OF THE INVENTION

It is therefore an objective of the present invention to provide a novel stylus sensing circuit and stylus resistant to noises, in order to solve the abovementioned problem.

An embodiment of the present invention discloses a stylus sensing circuit, which comprises a receiving circuit, a demodulation circuit and a detection circuit. The receiving circuit receives a downlink signal from a stylus, wherein the downlink signal comprises a plurality of frequency signals. The demodulation circuit, coupled to the receiving circuit, demodulates the downlink signal to extract each of the plurality of frequency signals. The detection circuit, coupled to the demodulation circuit, chooses one of the plurality of frequency signals to perform a signal processing.

Another embodiment of the present invention discloses a stylus, which comprises a plurality of signal generators and a mixer. The plurality of signal generators generate a plurality of frequency signals having different frequencies. The mixer, coupled to the plurality of signal generators, combines the plurality of frequency signals to generate a downlink signal. A first frequency signal and a second frequency signal among the plurality of frequency signals carry a same information.

These and other objectives of the present invention will no doubt become obvious to those of ordinary skill in the art after reading the following detailed description of the preferred embodiment that is illustrated in the various figures and drawings.

DETAILED DESCRIPTION

As mentioned above, the conventional easy pen has worse anti-noise capability since it can only output downlink signals in only one frequency and the frequency cannot be changed. The output signal will easily be interfered with if there is a noise on the frequency of the downlink signal.

In order to solve the problem, the present invention provides a novel stylus capable of outputting a downlink signal containing more than two frequency components. If any of the frequency components is interfered with by a noise, the stylus sensing circuit of the touch panel may still process the downlink signal on other frequencies, to obtain an accurate sensing result immune to noise interferences.

Figure 1:
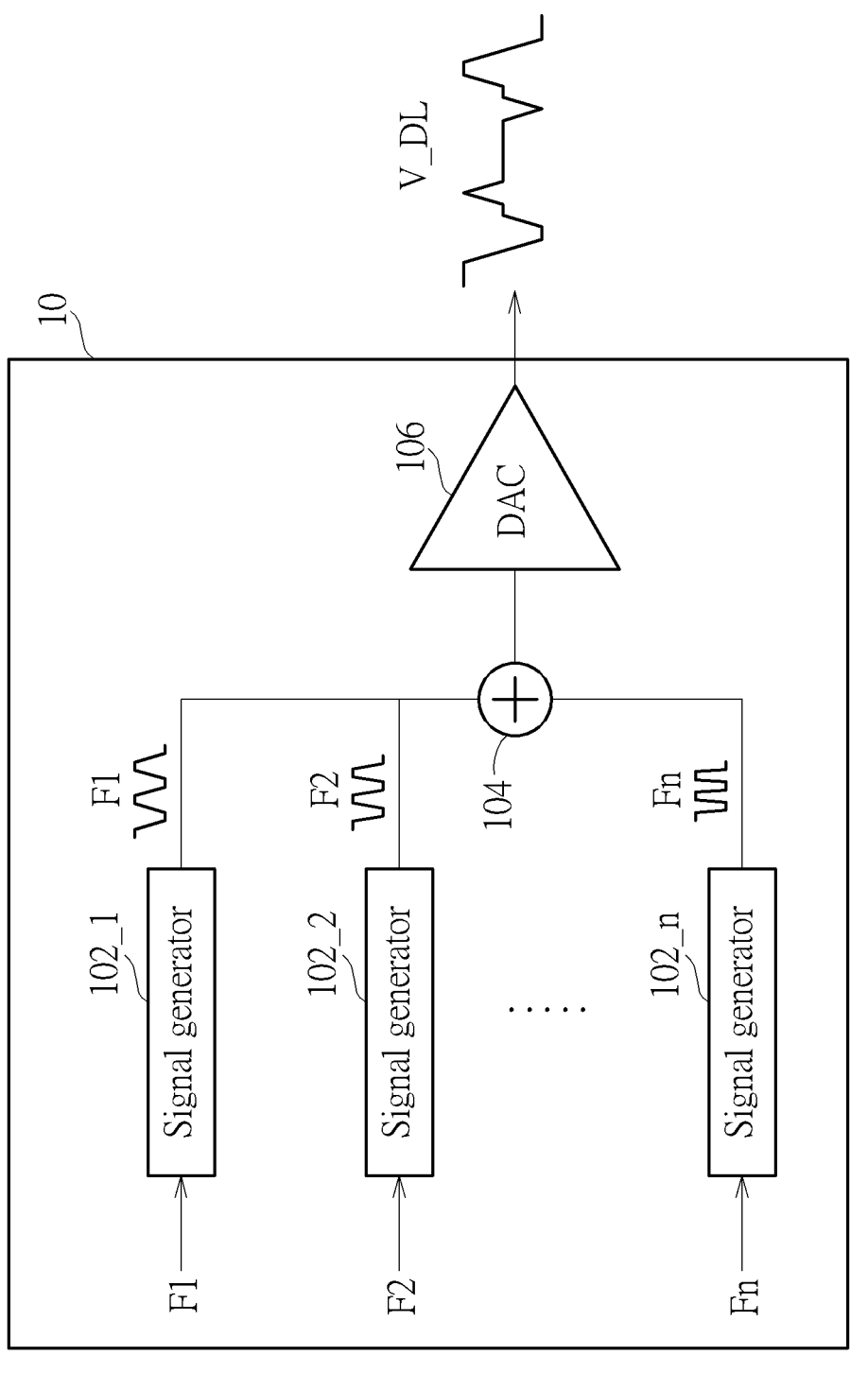
FIG. 1 is a schematic diagram of a stylus according to an embodiment of the present invention.

FIG. 1 is a schematic diagram of a stylus 10 according to an embodiment of the present invention. The stylus 10 includes a plurality of signal generators 102_1-102_n, a mixer 104 and a digital-to-analog converter (DAC) 106.

As shown in FIG. 1, the plurality of signal generators 102_1-102_n may generate and output frequency signals F1-Fn having different frequencies, respectively, where n may be any integer greater than or equal to 2. Each of the generated frequency signals F1-Fn may be a single tone signal, which may be a sine-wave signal or square-wave signal having a single frequency, and the waveform type is not limited thereto.

The mixer 104, which is coupled between the signal generators 102_1-102_n and the DAC 106, may combine the frequency signals F1-Fn to generate a downlink signal V_DL. The DAC 106 then converts the downlink signal V_DL from the digital form into the analog form, and outputs the downlink signal V_DL.

Figure 2:
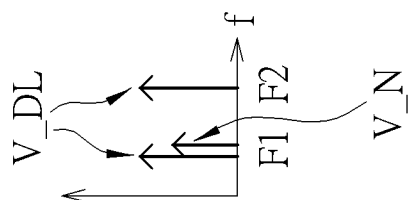
FIG. 2 is a schematic diagram of a stylus sensing circuit according to an embodiment of the present invention.
Figure 2:
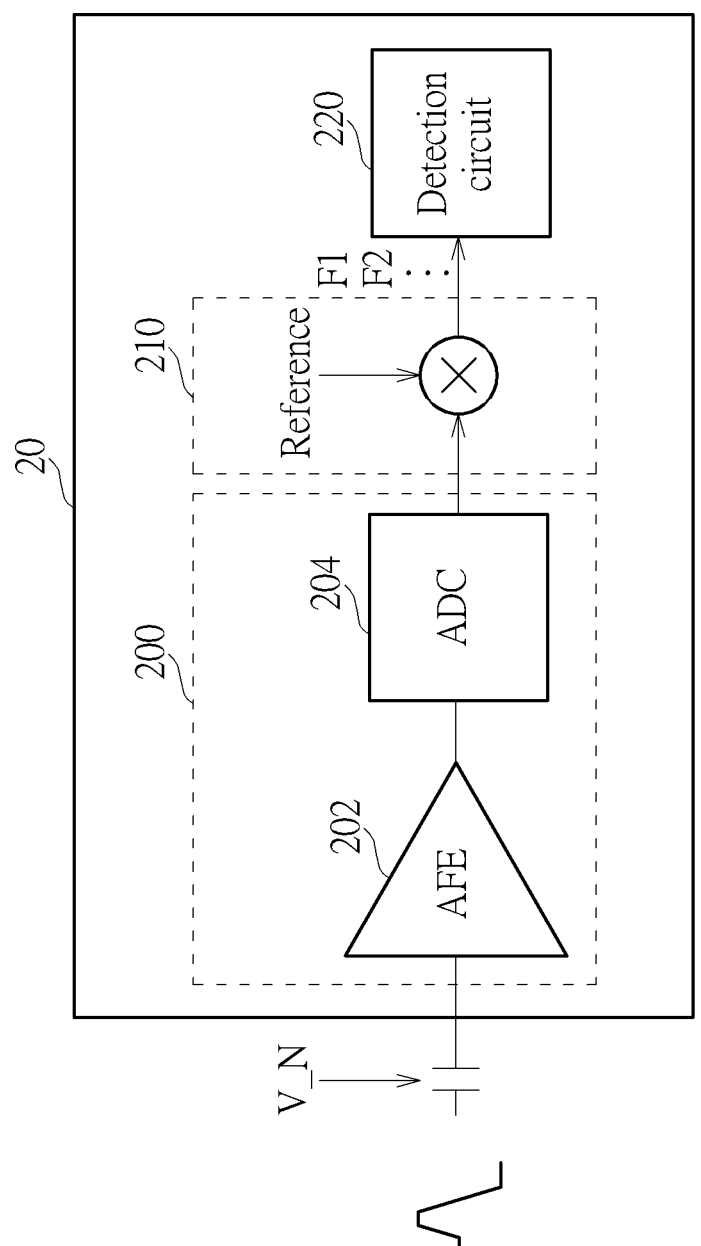

FIG. 2 is a schematic diagram of a stylus sensing circuit 20 according to an embodiment of the present invention. The stylus sensing circuit 20 includes a receiving circuit 200, a demodulation circuit 210 and a detection circuit 220.

As shown in FIG. 2, the receiving circuit 200, which may receive the downlink signal V_DL containing the frequency signals F1-Fn from the stylus 20, includes an analog front-end (AFE) circuit 202 and an analog-to-digital converter (ADC) 204. The AFE circuit 202 may be or include a sample-and-hold circuit for sampling the downlink signal V_DL. The ADC 204 may convert the downlink signal V_DL in the analog form (such as a voltage signal) into the digital form, and then output the downlink signal V_DL to the demodulation circuit 210.

The demodulation circuit 210, which is coupled between the receiving circuit 200 and the detection circuit 220, may demodulate the downlink signal V_DL to extract each of the frequency signals F1-Fn. For example, if the downlink signal V_DL includes two frequency signals F1 and F2, the demodulation circuit 210 may restore the frequency signal F1 and the frequency signal F2 through demodulation, where the frequency signals F1 and F2 may be single tone signals as equivalent to the frequency signals generated by the signal generators of the stylus 10. In an embodiment, the demodulation circuit 210 may perform convolution on the downlink signal V_DL with a reference signal corresponding to a first frequency to generate the frequency signal F1, and also perform convolution on the downlink signal V_DL with another reference signal corresponding to a second frequency to generate the frequency signal F2.

The generated frequency signals F1-Fn may further be sent to the detection circuit 220, which may choose one of the frequency signals F1-Fn to perform signal processing. In an embodiment, the detection circuit 220 may determine which frequency is interfered with a noise, and choose one of the frequency signals F1-Fn not interfered with by any noise to perform subsequent signal processing. For example, as shown in FIG. 2, assume that the downlink signal V_DL includes two frequency signals F1 and F2, and that a noise V_N interfering with the frequency of F1 is inserted and received by the stylus sensing circuit 20 with the downlink signal V_DL. The detection circuit 220 may determine that the frequency signal F1 is interfered with by the noise V_N, and thereby choose the frequency signal F2 for subsequent signal processing.

The multi-frequency implementation of the present invention aims at reducing or canceling noise interferences on the downlink signal V_DL. The noise V_N may appear randomly and unexpectedly, and thus may interfere with any frequency signals at a time point. At this moment, the stylus sensing circuit 20 (i.e., the detection circuit 220) may choose any other frequency signals not interfered with by noises to perform signal processing. In such a situation, necessary information provided by the stylus 10 may be included in every one of the frequency signals F1-Fn, so that the detection circuit 220 and its back-end circuitry will be able to obtain the necessary information no matter which frequency signal is chosen. In an embodiment, each of the frequency signals F1-Fn may carry the same information; hence, the stylus sensing circuit 20 may choose any one of the frequency signals F1-Fn to perform signal processing, and this information may be successfully obtained.

For example, the stylus 10 is requested to send pressure information to the stylus sensing circuit 20, and the frequency signals F1-Fn contained in the same downlink signal V_DL may carry the same part of the pressure information. For example, the frequency signals F1-Fn may include the same data codes and/or the same signal strength that allows the detection circuit 220 to extract the same information after the corresponding signal processing. Based on the noise detection result, the detection circuit 220 may obtain all the necessary information regardless of which frequency signal is chosen.

In another embodiment, the frequency signals contained in a downlink signal may carry different information. The stylus sensing circuit 20 can thereby choose one or more appropriate frequency signals to perform signal processing to achieve the anti-noise effect. In addition, with the combination of multiple frequency signals in one downlink signal, the signal bandwidth of transmitting the requested downlink information may be increased, thereby reducing the time consumption for transmitting the downlink information.

Figure 3:
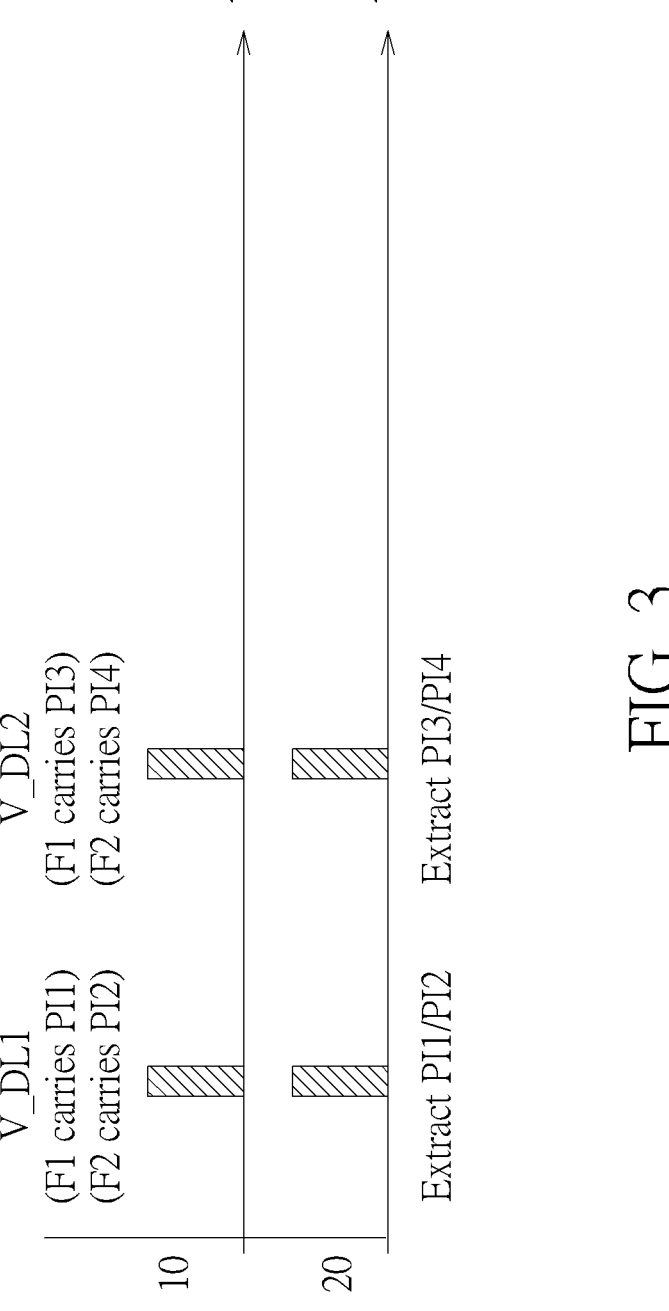
FIG. 3 illustrates that the stylus sends pressure information to the stylus sensing circuit through frequency signals of the downlink signals.

For example, the stylus 10 is requested to send pressure information to the stylus sensing circuit 20, as shown in FIG. 3. The pressure information may be divided into 4 parts, as the pressure information PI1-PI4. The pressure information PI1 and PI2 may be contained in a downlink signal V_DL1, and the pressure information PI3 and PI4 may be contained in another downlink signal V_DL2. Each of the downlink signals V_DL1 and V_DL2 may include two frequency signals F1 and F2. In this embodiment, the frequency signal F1 of the downlink signal V_DL1 carries the pressure information PI1, the frequency signal F2 of the downlink signal V_DL1 carries the pressure information PI2, the frequency signal F1 of the downlink signal V_DL2 carries the pressure information PI3, and the frequency signal F2 of the downlink signal V_DL2 carries the pressure information PI4.

When receiving the downlink signal V_DL1, the stylus sensing circuit 20 may determine whether the frequency signal F1 or F2 is interfered with by noises, and thereby choose the frequency signal F1 or F2 or both to perform signal processing, so as to perform demodulation to obtain the pressure information PI1 and/or PI2. When receiving the downlink signal V_DL2, the stylus sensing circuit 20 may determine whether the frequency signal F1 or F2 is interfered with by noises, and thereby choose the frequency signal F1 or F2 or both to perform signal processing, so as to perform demodulation to obtain the pressure information PI3 and/or PI4. If any of the pressure information PI1-PI4 cannot be successfully extracted due to noise interferences or any other problems, the stylus sensing circuit 20 may send a notification to the stylus 10 to request a retransmission, or may restore the entire pressure information based on other parts.

In fact, different frequency signals contained in the same downlink signal may carry the same or different information based on system requirements, to improve the flexibility of allocating information in the downlink signals. For example, there may be three frequency signals F1-F3 contained in a downlink signal, and the first frequency signal F1 and the second frequency signal F2 may carry the same information (or the same part of the downlink information), while the third frequency signal F3 may carry different information (or different parts) from those carried by the first frequency signal F1 and the second frequency signal F2.

Note that the stylus sensing circuit usually receives the downlink signal through voltage variation caused by capacitance coupling on the touch panel, and the generated voltage variation is quite small and easily interfered with by noises. Those noises may include, but not limited to, display noises resulting from load variations due to changing of display data, charger noises resulting from any power source, or any other environmental noises.

Also note that the circuit structure of the stylus sensing circuit 20 is merely an exemplary embodiment of the present invention. In another embodiment, the demodulation circuit may include more than 2 demodulators. For example, assume that a demodulator is capable of demodulating 4 frequencies, and that there are 8 frequency signals contained in the received downlink signal. In such a situation, the demodulation circuit may include 2 demodulators for processing the downlink signal.

In an embodiment, the stylus sensing circuit 20 may further include a memory (not illustrated) such as a static random access memory (SRAM), which may be coupled between the demodulation circuit 210 and the detection circuit 220, for storing the raw data of the frequency signals F1, F2 . . . which are obtained from the demodulation operation. The raw data may include information of the received signal intensities received at several positions of the touch panel. The detection circuit 220 thereby chooses the raw data of a chosen frequency signal to calculate the signal distributions of the stylus, in order to obtain the coordinate of the stylus on the touch panel, where the chosen frequency signal is in a frequency determined to be free from noise interferences.

In an embodiment, the stylus sensing circuit 20 may further include a filter (not illustrated), which is used for filtering out several unwanted frequencies without carrying any frequency signals, to facilitate the frequency signal extraction of the demodulation circuit 210.

Figure 4A:
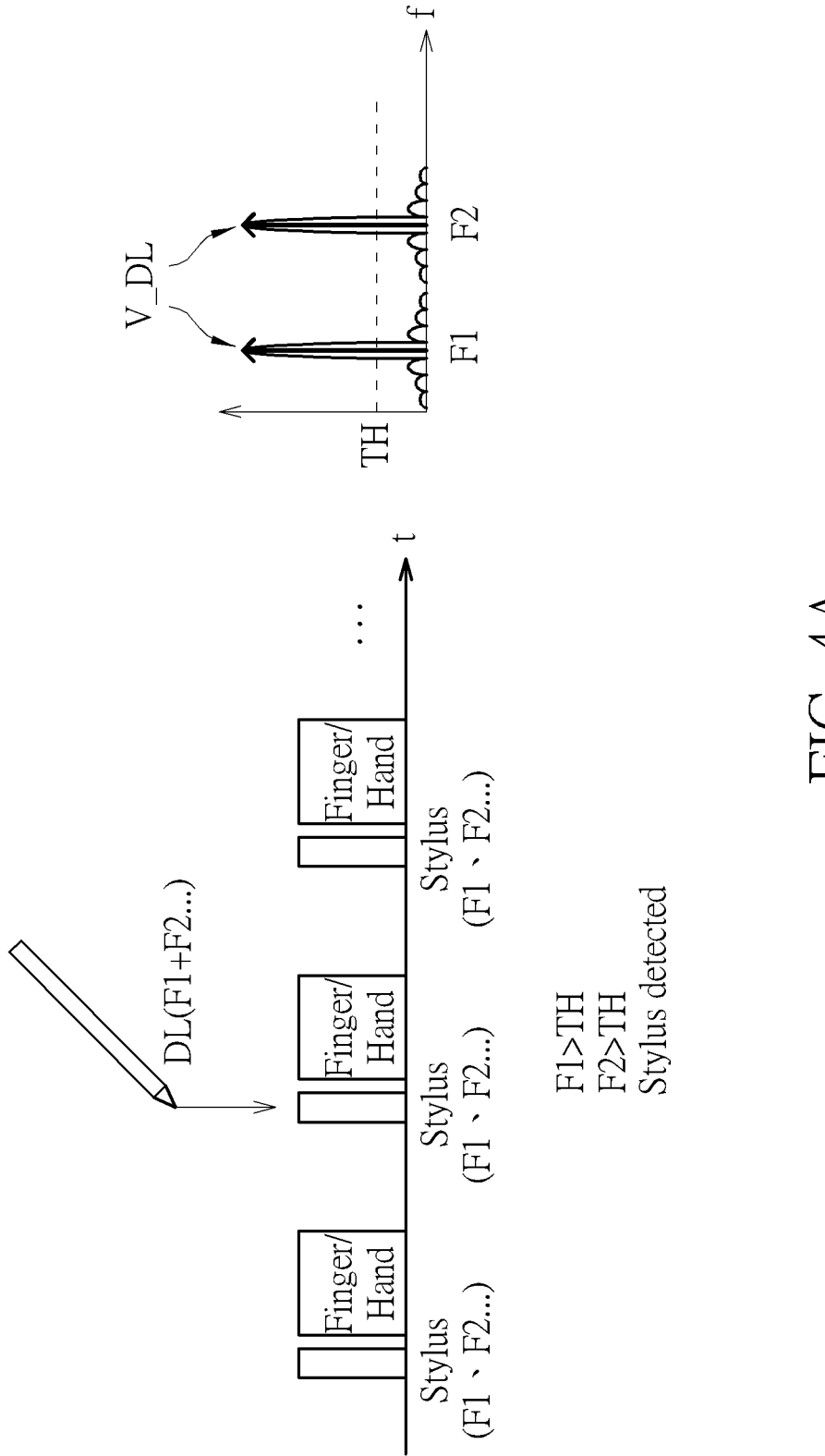
FIG. 4A illustrates stylus detection of the stylus sensing circuit according to an embodiment of the present invention.

FIG. 4A illustrates stylus detection of the stylus sensing circuit according to an embodiment of the present invention. The stylus sensing circuit (such as the stylus sensing circuit 20 shown in FIG. 2) may be integrated with a touch sensing circuit capable of finger touch (or called hand touch) functions, to be operated in a hand mode or a stylus mode. When the stylus sensing circuit 20 is operated in the hand mode, the stylus detection and finger touch detection are performed time-divisionally. More specifically, as shown in FIG. 4A, several time slots are allocated to stylus detection, and several time slots are allocated to finger touch (or hand touch) detection. A time slot for stylus detection may be allocated to a column or a row of sensor pads, but not limited thereto.

Assume that the downlink signal V_DL expected to be output by the stylus 10 includes two frequency signals F1 and F2. In the time slots for stylus detection, the detection circuit 220 may detect the frequencies of F1 and F2, to determine whether there is a frequency signal on the detected frequencies. In an embodiment, a threshold value TH may be set, allowing the detection circuit 220 to determine whether the signal strength on the detected frequencies is greater than the threshold value TH, so as to determine whether the stylus 10 exists.

In an embodiment, when the detection circuit 220 detects that the signal strength of each frequency signal is greater than the threshold value TH, it may determine that a stylus is approaching or contacting the touch panel to output the downlink signal V_DL, and thereby control the stylus sensing circuit 20 to be switched to a stylus mode. For example, as shown in FIG. 4A, the downlink signal V_DL includes two frequency signals F1 and F2. In a time slot, the detection circuit 220 detects that the strengths of the frequency signals F1 and F2 are both greater than the threshold value TH, which indicates that there is a stylus approaching or contacting the touch panel. In such a situation, the detection circuit 220 may determine that the stylus is detected, and control the stylus sensing circuit 20 to enter the stylus mode for further operations such as stylus positioning.

Note that the downlink signal V_DL is composed of multiple frequency signals F1, F2 . . . ; hence, the stylus is detected only when every frequency signal contained in the downlink signal V_DL is detected. Therefore, if any frequency signal expected to be received in the downlink signal V_DL is not detected, which means that the signal strength on the frequency(s) of at least one of the frequency signals is smaller than the threshold value TH, the detection circuit 220 may not determine that a stylus exists, and thereby control the stylus sensing circuit 20 to stay in the hand mode.

In a conventional stylus control system where the downlink signal is sent in only one frequency, the stylus sensing circuit in the hand mode may erroneously enter the stylus mode if this frequency is interfered with by noises such that the received signal strength exceeds a specific threshold. In comparison, in the present invention, the downlink signal is composed of multiple frequency signals, and the stylus sensing circuit determines whether to enter the stylus mode based on the detection of all frequency signals. This ensures that the stylus sensing circuit can enter the stylus mode in an accurate time point, to be free from the noise interferences.

When the stylus sensing circuit 20 is in the hand mode, noise detection may be performed in a similar manner. By comparing with the threshold value TH, the detection circuit 220 may detect the noises corresponding to each frequency signal, i.e., the noises that might interfere with the frequency signals carried in the downlink signal V_DL. Based on the noise detection result, the detection circuit 220 may choose a frequency signal not interfered with by any noises to perform subsequent signal processing.

Figure 4B:
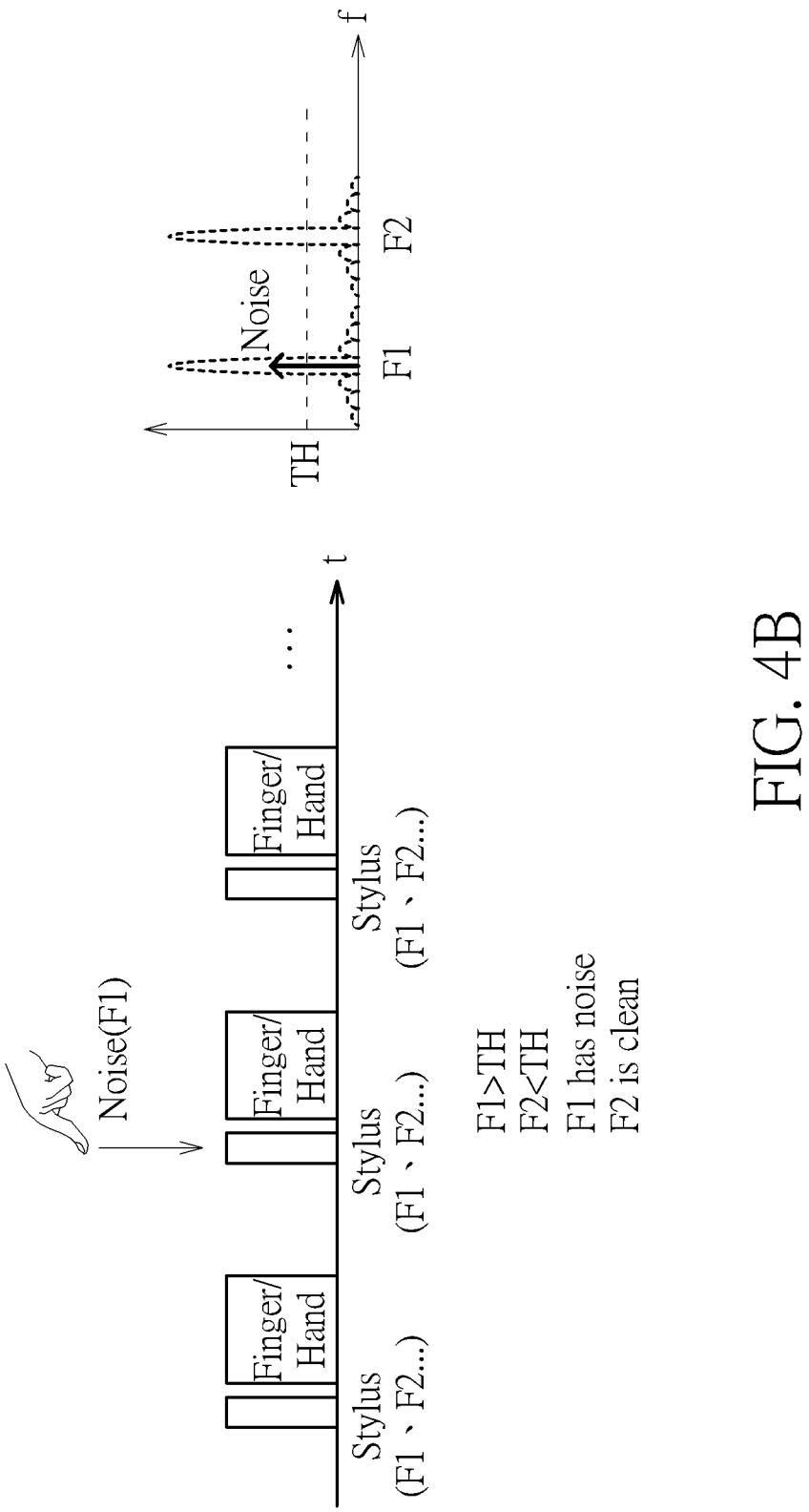
FIG. 4B illustrates noise detection of the stylus sensing circuit according to an embodiment of the present invention.

FIG. 4B illustrates noise detection of the stylus sensing circuit according to an embodiment of the present invention. In a time slot, there is no stylus approaching or contacting the touch panel, but a finger touch on the touch panel may be interfered with by a charger noise, which has a noise component on a first frequency of the frequency signal F1. Therefore, the detection circuit 220 may detect that the signal strength on the first frequency is greater than the threshold value TH, while the signal strength on a second frequency of the frequency signal F2 is smaller than the threshold value TH. In such a situation, the detection circuit 220 may determine that there is a noise on the first frequency.

Therefore, if a stylus is detected in a subsequent time slot, the detection circuit 220 may choose the second frequency of the frequency signal F2, which is clean and not interfered with by noises, to perform the related signal processing and calculation.

In an embodiment, the stylus sensing circuit 20 may perform stylus detection and noise detection simultaneously. As mentioned above, the stylus sensing circuit 20 in the hand mode may perform stylus detection and noise detection in a similar manner by comparing the received signal strengths on specific frequencies with a threshold value. Therefore, based on the detection result associated with the signal strength on each frequency, the detection circuit 220 may determine the existence of a stylus and also determine whether there is a noise on any of the detected frequencies.

When the stylus sensing circuit 20 is in the stylus mode, the detection circuit 220 may choose an optimal frequency for signal processing according to signal variations of the frequency signals. The stylus sensing circuit 20 may enter the stylus mode if a stylus approaching or contacting the touch panel is detected, and thus the detection circuit 220 may obtain more signal information to perform frequency signal selection. Note that if a frequency has a larger signal variation, this frequency might more probably be interfered with by noises; if a frequency has a smaller signal variation, this frequency might be more suitable to perform subsequent signal processing and calculation to avoid the interference of noises.

Figure 5:
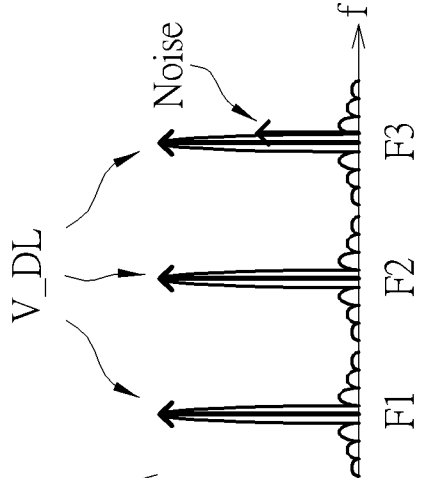
FIG. 5 illustrates frequency selection in the stylus mode according to an embodiment of the present invention.

FIG. 5 illustrates frequency selection in the stylus mode according to an embodiment of the present invention. In this embodiment, the downlink signal V_DL may include three frequency signals F1-F3. The stylus sensing circuit 20 may receive the downlink signal V_DL in a series of frame periods FP1-FP6, and the demodulation circuit 210 may perform demodulation on the downlink signal V_DL to extract the signal strengths of the frequency signals F1-F3 in the frame periods FP1-FP6. The signal strengths may further be normalized to the same level to perform comparison, and related data in each frequency may be obtained through demodulation and then stored in the memory.

FIG. 5 shows normalized signal strengths of the frequency signals F1-F3 in the frame periods FP1-FP6. The detection circuit 220 may choose an optimal frequency signal to perform signal processing according to the variations of these signal strengths. Preferably, the detection circuit 220 may choose a frequency signal having the minimum signal variation to perform signal processing. In this embodiment, the signal variation (VAR) may represent the maximum signal value minus the minimum signal value. As shown in FIG. 5, the signal variation of F1 is 100, the signal variation of F2 is 50, and the signal variation of F3 is 400; hence, the frequency signal F2 having the minimum signal variation may be chosen.

Note that each frequency signal F1-F3 received by the stylus sensing circuit 20 may possess a certain variation in a practical circuit system. Therefore, it is preferable that the detection circuit 220 chooses only one frequency signal to perform subsequent signal processing, in order to minimize the noise interferences. The chosen frequency signal may be one with the minimum signal variation and determined to be least affected by noises.

In an embodiment, assume that the detection circuit 220 may currently use the frequency signal F3 to calculate the coordinate of the stylus 10, and a noise may appear on the frequency of the signal F3. Due to the noise interference, after reception of the frequency signals F1-F3 in the frame periods FP1-FP6, the detection circuit 220 may determine that the signal variation of the frequency signal F3 is equal to 400, which may be greater than a threshold value for triggering the hopping. In such a situation, the detection circuit 220 may perform hopping to use another frequency to perform signal processing and calculate the stylus coordinate. In this embodiment, since the frequency signal F2 has the minimum signal variation, the detection circuit 220 may be switched to use the frequency signal F2 when hopping.

In another embodiment, when hopping is triggered, the target frequency signal may be chosen in another manner. For example, the detection circuit 220 may choose a frequency signal which may be determined to be free from noises in a previous noise detection operation, such as the noise detection performed in the hand mode as described above.

Figure 6:
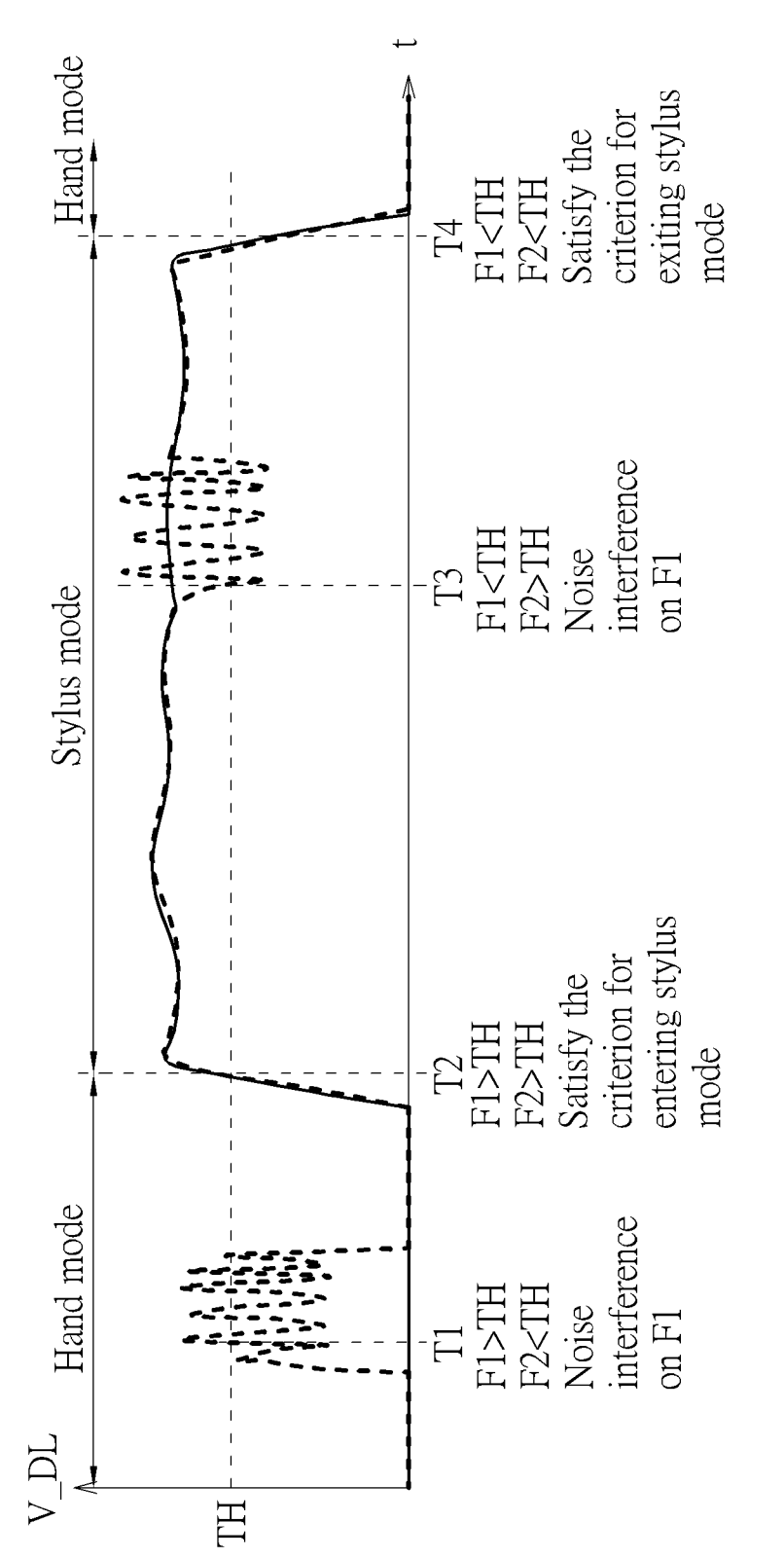
FIG. 6 illustrates an integration of stylus detection and noise detection based on the downlink signal V_DL.

FIG. 6 illustrates an integration of stylus detection and noise detection based on the downlink signal V_DL, which may be output to the stylus sensing circuit 20 from the stylus 10. As shown in FIG. 6, the downlink signal V_DL includes two frequency signals F1 and F2. Assuming that the stylus sensing circuit 20 is operated in the hand mode originally, the detection circuit 220 may determine whether the stylus sensing circuit 20 needs to be switched to the stylus mode based on the received downlink signal V_DL.

At the time point T1, the frequency signal F1 is interfered with by a noise to have a severe signal variation; hence, the detection circuit 220 may determine that the signal strength on the frequency of the frequency signal F1 is greater than a threshold value TH, while the signal strength on the frequency of the frequency signal F2 is still smaller than the threshold value TH. At this moment, the stylus sensing circuit 20 may stay in the hand mode.

At the time point T2, the stylus 10 may approach or contact the touch panel; hence, the detection circuit 220 may determine that the signal strengths on the frequencies of the frequency signal F1 and the frequency signal F2 are both greater than the threshold value TH. At this moment, the criterion of entering the stylus mode is satisfied, and thus the stylus sensing circuit 20 may be switched to the stylus mode.

Assume that the detection circuit 220 chooses the frequency signal F1 for signal processing and calculation when the stylus sensing circuit 20 enters the stylus mode. Subsequently, at the time point T3, the frequency signal F1 is interfered with by a noise to have a severe signal drop; hence, the detection circuit 220 may determine that the signal strength on the frequency of the frequency signal F1 is smaller than the threshold value TH, while the signal strength on the frequency of the frequency signal F2 is still greater than the threshold value TH. At this moment, the stylus sensing circuit 20 may stay in the stylus mode. In addition, since the frequency signal F1 is determined to have noise interference, the detection circuit 220 may change to choose the frequency signal F2 to perform signal processing and calculation, so as to improve the stability of the stylus sensing operation.

At the time point T4, the stylus 10 may depart from the touch panel; hence, the detection circuit 220 may determine that the signal strengths on the frequencies of the frequency signal F1 and the frequency signal F2 are both smaller than the threshold value TH. At this moment, the criterion of exiting the stylus mode is satisfied, and thus the stylus sensing circuit 20 may exit the stylus mode and may be switched to the hand mode.

In the above embodiment, the criteria for being switched to the stylus mode from the hand mode and switched to the hand mode from the stylus mode apply the same threshold value TH to perform determination. Those skilled in the art should understand that different threshold values may be applied in these two scenarios. For example, in the hand mode, a threshold value TH1 may be applied to determine whether the stylus sensing circuit 20 should be switched to the stylus mode; and in the stylus mode, another threshold value TH2 may be applied to determine whether the stylus sensing circuit 20 should be switched to the hand mode. The threshold values TH1 and TH2 may be the same or different, and may be controlled independently or correspondingly.

Please note that the present invention aims at providing a stylus capable of outputting a downlink signal containing multiple frequency signals and a stylus sensing circuit capable of processing and demodulating the downlink signal to restore the frequency signals. Those skilled in the art may make modifications and alterations accordingly. For example, in the above embodiments, a downlink signal may be generated by combining 2 or 3 frequency signals. In fact, the number of frequency signals contained in the downlink signal is not limited thereto. In addition, in the above embodiment, a frame period may have a time slot allocated to stylus detection in which the detection circuit processes the downlink signal to obtain the signal strength of each frequency signal in several sensor pads, and have another time slot for finger touch detection. In another embodiment, a frame period may include multiple time slots allocated to stylus detection, and/or a time slot may be used to receive the downlink signals from multiple groups of sensor pads. The related allocation and implementation of time slots may be predetermined based on the protocol of the stylus control system. Note that an easy pen may continuously output downlink signals, and thus the stylus sensing circuit may receive the downlink signals at any time.

In an embodiment, the detection circuit may choose a frequency signal to perform calculation to determine the coordinate of the stylus. In another embodiment, after the frequency signals in different frequencies are obtained, the detection circuit may perform calculation by using different frequency signals, to generate coordinates corresponding to different frequencies. In such a situation, the detection circuit may choose a coordinate corresponding to a specific frequency not interfered with by noises as the stylus positioning result, or may combine several coordinates corresponding to frequencies not interfered with by noises to generate the stylus positioning result.

Note that the above embodiments are applicable to an easy pen capable of unidirectional transmissions. In another embodiment, the implementation of combining multiple frequency signals in one downlink signal may also be applied to a bidirectional stylus, which may use the Wacom WGP protocol, Universal Stylus Initiative (USI) protocol, or any other protocol to perform bidirectional communications. The downlink signal output by the bidirectional stylus may also contain multiple frequency components, and the demodulation circuit of the stylus sensing circuit may be able to restore each of the frequency components, to determine whether the stylus exists and detect the noise interferences. The anti-noise capability may still be improved by including more frequencies in the downlink signal of the bidirectional stylus.

Figure 7:
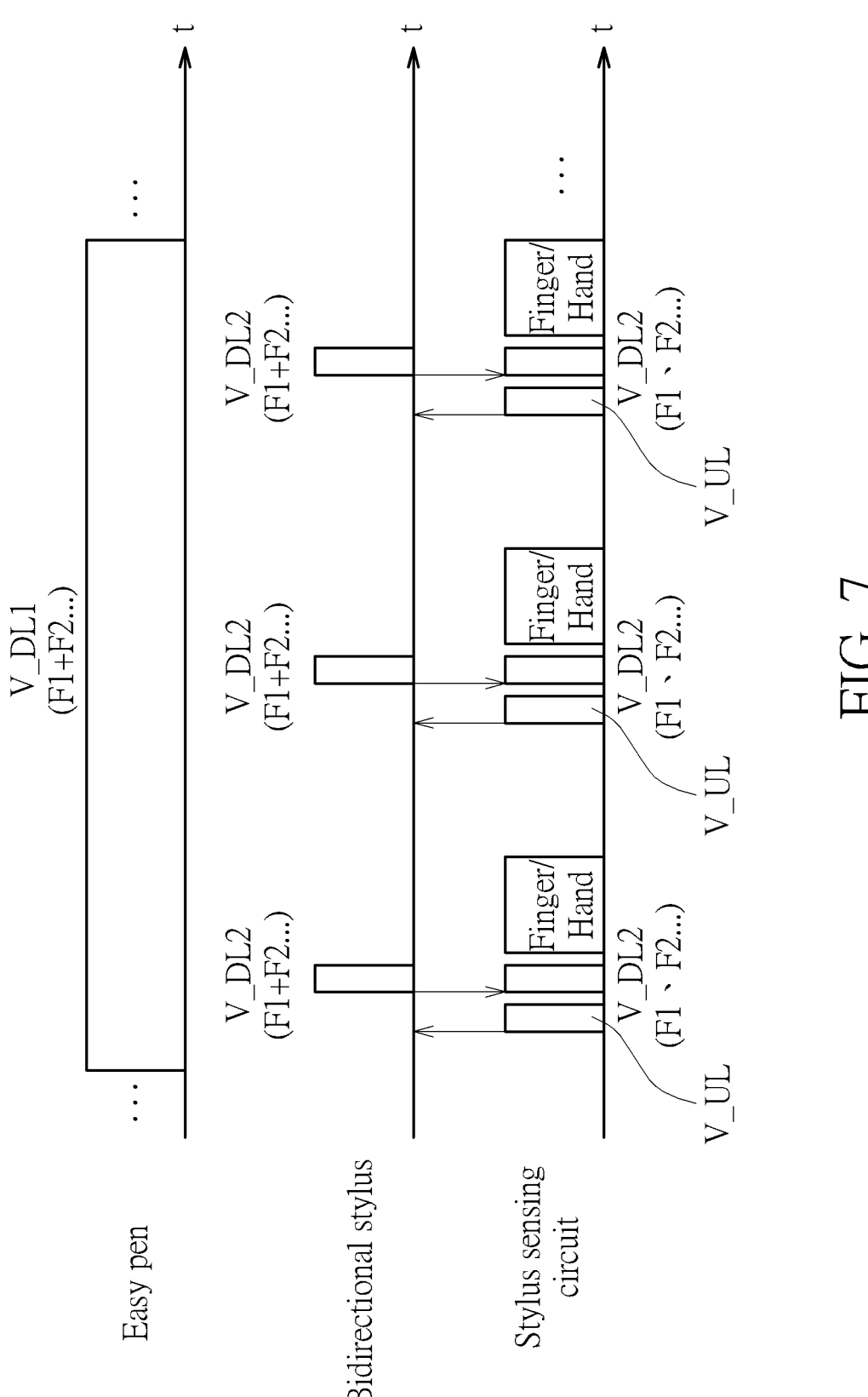
FIG. 7 illustrates stylus detection performed on an easy pen and a bidirectional stylus.

FIG. 7 illustrates stylus detection performed on an easy pen and a bidirectional stylus. As shown in FIG. 7, the easy pen may continuously output a downlink signal V_DL1 without receiving any uplink signals, where the downlink signal V_DL1 may be a combination of multiple frequency signals. Differently, the bidirectional stylus is capable of receiving uplink signals V_UL from the stylus sensing circuit and outputting downlink signals V_DL2 to the stylus sensing circuit. Therefore, the stylus sensing circuit may be allocated to have an uplink period, a downlink period, and a finger touch (or hand touch) detection period.

As for the bidirectional stylus, it may receive the uplink signal V_UL from the stylus sensing circuit, where the uplink signal V_UL may indicate a subsequent time period (i.e., the downlink period allocated to the stylus sensing circuit) for receiving the downlink signal V_DL2. Accordingly, the bidirectional stylus may output the downlink signal V_DL2 in the specified time period. The downlink signal V_DL2 output by the bidirectional stylus may be a combination of multiple single-tone frequency signals having different frequencies. Alternatively, the downlink signal V_DL2 may be a combination of multiple data having different frequencies, such as encoded data embedded in carrier waves of different frequencies. The data may contain any information, such as the position of the stylus and the pressure sensed by the stylus. No matter whether the downlink signal V_DL2 is composed of single-tone signals or encoded data, the multi-frequency implementation will achieve a better anti-noise effect.

In an embodiment, the bidirectional stylus applying the multi-frequency implementation may be a simplified device, where the uplink signal sent by the stylus only has a simplified format to carry simplified information or only includes single-tone signals without encoding. This type of stylus may not support frequency hopping or other complex functions but may only support timing synchronization function. The timing synchronization function allows the stylus to output the downlink signal in the time period specified by the stylus sensing circuit, where the anti-noise effect may be achieved without the usage of the frequency hopping function.

To sum up, the present invention provides a stylus sensing circuit and a stylus resistant to noises. The stylus is capable of outputting a downlink signal containing multiple frequency signals having different frequencies. The stylus sensing circuit may receive the downlink signal and extract the frequency signals from the downlink signal by performing demodulation. Based on the noise detection result, the detection circuit of the stylus sensing circuit may choose an optimal frequency signal determined to be free from noises to perform signal processing and related calculations for positioning. When the stylus sensing circuit is operated in the hand mode, the detection circuit may detect the frequency corresponding to each frequency signal to determine whether there is a stylus approaching or contacting the touch panel, and also determine the existence of any noise. The stylus is detected only when every frequency signal contained in the downlink signal V_DL is detected. If the signal is detected only in one or partial frequencies, the signal may be determined to be a noise. When the stylus sensing circuit is operated in the stylus mode, the stylus sensing circuit may choose an optimal frequency signal for signal processing according to signal variations of each frequency signal. The implementation of multi-frequency downlink signal may be applied to an easy pen capable of only downlink transmissions or a bidirectional stylus capable of both uplink and downlink transmissions.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A stylus sensing circuit comprising:
   a receiving circuit to receive a downlink signal from a stylus, the downlink signal comprising a plurality of frequency signals;
   a demodulation circuit, coupled to the receiving circuit, to demodulate the downlink signal to extract each of the plurality of frequency signals; and
   a detection circuit, coupled to the demodulation circuit, to receive the plurality of frequency signals from the demodulation circuit and choose one of the plurality of frequency signals to perform a signal processing, and ignore another one of the plurality of frequency signals which is determined to be interfered with by a noise.

2. The stylus sensing circuit of claim 1, wherein each of the plurality of frequency signals is a single tone signal.

3. The stylus sensing circuit of claim 1, wherein the receiving circuit comprises:
   an analog front-end (AFE) circuit to sample the downlink signal; and
   an analog-to-digital converter (ADC), coupled to the AFE circuit, to convert the downlink signal into a digital form and output the downlink signal to the demodulation circuit.

4. The stylus sensing circuit of claim 1, wherein the detection circuit performs the signal processing to obtain a coordinate of the stylus on a touch panel.

5. The stylus sensing circuit of claim 1, wherein the detection circuit chooses only one of the plurality of frequency signals to perform the signal processing.

6. The stylus sensing circuit of claim 1, wherein a first frequency signal and a second frequency signal among the plurality of frequency signals carry a same information.

7. The stylus sensing circuit of claim 1, wherein a first frequency signal and a second frequency signal among the plurality of frequency signals carry different information.

8. The stylus sensing circuit of claim 1, wherein the detection circuit detects the noise corresponding to each of the plurality of frequency signals, to choose the one of the plurality of frequency signals to perform the signal processing according to a detection result of the noise.

9. The stylus sensing circuit of claim 8, wherein the detection circuit chooses the one of the plurality of frequency signals not interfered with by the noise to perform the signal processing.

10. The stylus sensing circuit of claim 1, wherein the detection circuit further detects a signal variation of each of the plurality of frequency signals, to choose the one of the plurality of frequency signals to perform the signal processing according to the signal variation.

11. The stylus sensing circuit of claim 10, wherein the detection circuit chooses one of the plurality of frequency signals having the minimum signal variation to perform the signal processing.

12. The stylus sensing circuit of claim 1, wherein the stylus sensing circuit is in a hand mode, and determines to be switched to a stylus mode when the detection circuit detects that a signal strength on a frequency of each of the plurality of frequency signals is greater than a threshold value.

13. The stylus sensing circuit of claim 12, wherein the stylus sensing circuit stays in the hand mode when the detection circuit detects that the signal strength on the frequency of at least one of the plurality of frequency signals is smaller than the threshold value.

14. The stylus sensing circuit of claim 12, wherein the plurality of frequency signals comprise a first frequency signal and a second frequency signal, and the detection circuit determines that there is a first noise on a first frequency of the first frequency signal when detecting that the signal strength on the first frequency of the first frequency signal is greater than the threshold value and the signal strength on a second frequency of the second frequency signal is smaller than the threshold value.

15. The stylus sensing circuit of claim 14, wherein the detection circuit chooses the second frequency signal to perform the signal processing.

16. The stylus sensing circuit of claim 1, wherein the stylus sensing circuit is in a stylus mode, and determines to be switched to a hand mode when the detection circuit detects that a signal strength on a frequency of each of the plurality of frequency signals is smaller than a threshold value.

17. The stylus sensing circuit of claim 16, wherein the stylus sensing circuit stays in the stylus mode when the detection circuit detects that the signal strength on the frequency of at least one of the plurality of frequency signals is greater than the threshold value.

18. The stylus sensing circuit of claim 16, wherein the plurality of frequency signals comprise a first frequency signal and a second frequency signal, and the detection circuit determines that there is a first noise on a first frequency of the first frequency signal when detecting that the signal strength on the first frequency of the first frequency signal is smaller than the threshold value and the signal strength on a second frequency of the second frequency signal is greater than the threshold value.

19. The stylus sensing circuit of claim 18, wherein the detection circuit chooses the second frequency signal to perform the signal processing.

20. A stylus comprising:
a plurality of signal generators to generate a plurality of frequency signals having different frequencies; and
a mixer, coupled to the plurality of signal generators, to combine the plurality of frequency signals to generate a downlink signal;
wherein a first frequency signal and a second frequency signal among the plurality of frequency signals carry a same information;
wherein the downlink signal is received by a stylus sensing circuit, and the stylus sensing circuit comprises a demodulation circuit for demodulating the downlink signal to extract each of the plurality of frequency signals;
wherein the stylus sensing circuit comprises a detection circuit for receiving the plurality of frequency signals from the demodulation circuit and choosing one of the plurality of frequency signals to perform the signal processing and ignoring another one of the plurality of frequency signals determined to be interfered with by the noise.

21. The stylus of claim 20, wherein each of the plurality of frequency signals is a single tone signal.

22. The stylus of claim 20, further comprising:
a digital-to-analog converter (DAC), coupled to the mixer, to convert the downlink signal into an analog form and output the downlink signal.

23. The stylus of claim 20, wherein each of the plurality of frequency signals carry the same information.

24. The stylus of claim 20, wherein the second frequency signal and a third frequency signal among the plurality of frequency signals carry different information.

* * * * *